Jan. 22, 1957 W. E. STINGER 2,778,868

INTEGRAL RADIO FREQUENCY ATTENUATION SEAL

Filed April 7, 1953

INVENTOR.
WALTER E. STINGER

BY F. J. Schmitt
Lewis M. Smith, Jr.
ATTORNEYS

United States Patent Office 2,778,868

Patented Jan. 22, 1957

2,778,868

INTEGRAL RADIO FREQUENCY ATTENUATION SEAL

Walter E. Stinger, Drexel Hill, Pa.

Application April 7, 1953, Serial No. 347,424

2 Claims. (Cl. 174—35)

Figure 2:
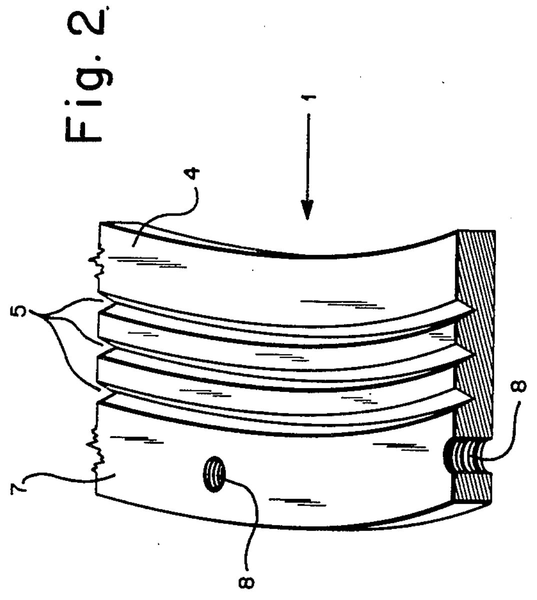

(Granted under Title 35, U. S. Code (1952), sec. 266)

The invention described herein may be manufactured and used by or for the Government of the United States of America for governmental purposes without the payment of any royalties thereon or therefor.

The invention relates to a "saw-tooth seam" in the formation of an integral radio frequency attenuation seal for use in equipment wherein radio frequency interference presents an electronic problem. Radio shielding of electrical instrumentalities capable of emitting radio waves has presented many difficulties. These are due to the characteristics of ignition and other circuits used with internal combustion engines, etc., such as aircraft engines. Repeated transient pulses emitted, due to the fact that they include fundamental and series of high frequency components extending into the radio frequency spectrum band, give rise to electro-magnetic fields which affect other electronic devices in the vehicle or other carrier and result in undesirable interference noises. Radio frequency leakage causes undesirable emissions which interfere with the remaining electronic or electrical gear in the particular system in which it is used. Shielding of the electronic equipment other than those emitting undesirable noise frequencies is impractical because of the fact that in the process of shielding, those intelligence signals which are desired to be picked up or utilized are also shielded.

A previous method of performing the function of the invention involved use of tapered or wedge type joints. A disadvantage of this method is that corrosion or oxidation of mating surfaces renders the seam unsatisfactory for radio interference suppression. Another method utilized flat polished surfaces. This is unsatisfactory because the flat surfaces must be polished after every opening of the seam in order to prevent loss of effectiveness due to oxidation or dirt. Use of fluted surfaces proved ineffective because of the necessity for high bolt pressures in installation. In addition the grooves have flat surfaces and great difficulty is experienced in obtaining continuous metal to metal contact around the periphery of the grooves. Other ways included grooved surfaces with conducting gaskets inserted in the groove, flat conducting gaskets between the mating surfaces and "finger-type" gaskets between the mating surfaces. It was found that conductive gaskets for the purpose necessitated replacement because of corrosion and loss of compressibility.

The seam of the present invention eliminates these inherent disadvantages and in addition possesses further advantages including elimination of the need of gaskets, retaining effectiveness in eliminating radio frequency interference before and after corrosion takes place, requiring very little bolt pressure for effectiveness, versatility in shape in which it may be fabricated and providing for insertion of flexible material between the surfaces to insure an air, water or oil seal.

Accordingly, one purpose of the "saw-tooth seam" of the present invention is to provide a low impedance path between mating surfaces.

Another aim of the invention is to eliminate the necessity for gaskets between surfaces in order to provide for satisfactory attenuation of radio interference leakage at the seams.

Another purpose of the invention is to provide a jointure which will be relatively inexpensive, yet highly effective and in which the effects of corrosion or oxidation of mating surfaces rendering the seam unsatisfactory for the purpose of the invention is avoided and in which necessity for polishing surfaces after every opening of the seam is dispensed with.

Another purpose is to exclude the necessity for high bolt pressures in installation in order to accomplish continuous metal to metal contact around the periphery of seams, thus eliminating the problem of distortion or destruction of the casing equipment.

Another object attendant in the elimination of conductive gaskets is to prevent the necessity of replacement due to corrosion or loss of compressibility during changes in installation or necessary repairs.

Another object of the invention is to present a new type of joint having superior shielding characteristics as well as greater economic feasibility.

Figure 3B:
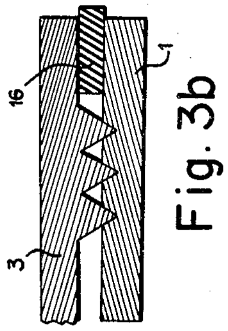
Figure 3A:
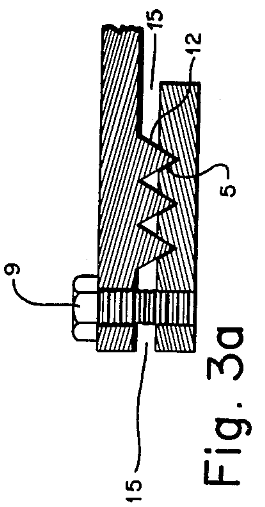
Figure 1:
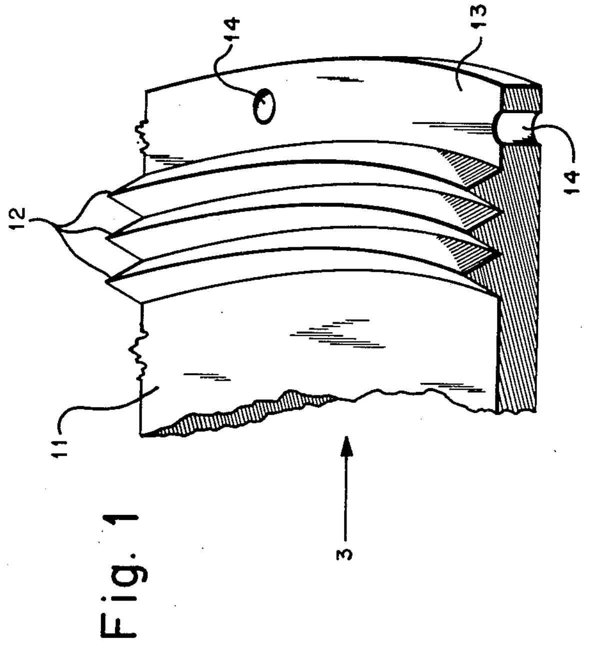

Other objects and many of the attendant advantages of this invention will be readily appreciated as the same becomes better understood by reference to the following detailed description when considered in connection with the accompanying drawings wherein:

Fig. 1 represents an isometric view of a section of a circular cover member embodying the principles of the present invention, Fig. 2 represents an isometric view of a section of a circular casing showing an upper surface with which the under surface of the cover member of Fig. 1 is mated, Fig. 3*a* represents a partial cross-sectional view showing sections of the mating surfaces bolted together in assembled relationship, and Fig. 3*b* represents a partial cross-sectional view in an opposed showing of a section of the mating surfaces shown in Fig. 3*a* with the addition of a gasket to insure an air, water and soil seal, if desired.

Referring to the drawings and in particular to the illustrative embodiment shown in Fig. 1 and Fig. 2, a conventional casing member indicated generally at 1 forms a radio frequency attenuating seal with a cover member indicated generally at 3. An inner bearing portion having an upper surface 4 is disposed internally of casing member 1. A series of grooves 5 are disposed outwardly concentric of the upper surface 4 of casing 1. For purposes of illustration three of these grooves have been shown but the number may be varied as feasibility in manufacture and in use may dictate. Concentric with and disposed around the groove members 5 is an outer portion having a flat upper surface 7. Disposed in spatial relationship in the outer portion and penetrating through flat surface 7 is a series of threaded bolt receiving holes 8. Bolt receiving holes 8 are threaded to form threaded apertures and are designed to have bolts 9 secured in them. Cover member 3 has an inner portion having a flat upper surface 11 and is surrounded by a group of concentric mating serrations or ridges 12. Serrations 12 are designed to be inserted in and mated with grooves 5 of casing member 1. Surrounding serrations 12 and concentric therewith appears an outer portion having a flat upper surface 13 to be placed in opposed relationship to and parallel with the flat surface 7 of casing 1. Disposed in spatial relationship around the outer portion and penetrating through face 13 of cover member 3 is a series of bolt receiving apertures 14 through which bolts or other securing members 9 are disposed and threaded into the threaded apertures 8 of casing member 1. Apertures 14 in cover member 3 are so disposed as to be aligned with the threaded apertures 8 of casing member 1. A plurality of bolts 9 are disposed through the plurality of apertures of cover member 3 and are threadedly inserted in threaded apertures 8 of casing member 1. The diameter of respective grooves 5 is made equal to the diameter of respective serrations 12 for mating purposes.

As best shown in Fig. 3*a* bolt holes 14 of cover member 3 are aligned with threaded bolt holes 8 of casing member 1 and the serrations 12 of cover member 3 are fitted into the grooves 5 of casing member 1. The serrations or ridges 12 have greater altitude dimension than that of the receiving grooves 5 thereby permitting space 15 to appear between cover 3 and the casing 1 for better tightening of bolts 9 to join cover 3 to casing 1. If desired, a peripheral resilient gasket 16 of a material such as rubber or the like may be supplied between the mating surfaces in a manner as illustrated in Fig. 3*b* to insure an air, water or oil seal in addition to the radio frequency seal as heretofore described or a gasket could be introduced.

In tests made using a simulated aircraft ignition system as an interference source, the results in utilizing this type of seal were so successful that it was found not even necessary to bolt the cover to the case. Light hand pressure was found satisfactory to stop radio frequency interference leakage through the seam. After exposing to corrosion tests were performed again and no detectable leakage was found present at the seam. It may be readily seen that the "saw-tooth" arrangement of the grooves on the lid and ring allow for continuous contact around its periphery. It should be noted from the configuration of the type of seal shown that fewer bolts are required to hold the lid in place thus saving time and materials, less pressure is required with this type of seal and the possibility of radio interference leakage due to faulty installation during maintenance is avoided. By virtue of small bolt pressure required, distortion of the parts such as bending out of shape is avoided.

The distance from center to respective grooves 5 and ridges 12 is identical and the slopes of sides of ridges and grooves are made substantially equal and ridges and grooves are designed to be vertically aligned when cover 3 and casing 1 are in mated relationship. Therefore, no deformation or strain of elements takes place. As heretofore pointed out, the seal has proved effective under light hand pressure without bolting cover and case together. Thus, it is apparent that no deformation on assembly or disassembly takes place and the cover may be repeatedly removed to effect repairs and reassembled with relatively light bolt tightening pressure without the necessity of replacement, repair or resurfacing of cover or casing and without impairing effectiveness of the radio frequency seal.

Various types of materials have been used in manufacture of these devices. The devices can be fabricated from any type of material that can take and hold "saw-tooth" grooves necessary for this type of seam. The "saw-tooth" seam can be used over and over again without any additional work being performed on it providing that the teeth are not totally damaged or very badly damaged during installation and maintenance. One example of a material which can be used advantageously in this device is aluminum stock.

Various modifications and changes will occur to one skilled in the art.

In the drawings the "saw-tooth" projections and the cooperating grooves are shown as being concentric.

These projections and grooves could be in spiral or other arrangement if desired. The seal is adaptable for use where the joint will be between rectangular, square or members shaped other than the circular embodiment indicated. For example, the walls of a rectangular case may be provided with flanges having the projections or grooves and the cover provided with cooperating grooves or projections. Many forms of materials may be utilized in construction of apparatus involving the inventive device. As hereinbefore indicated, the "saw-tooth" seam shown constructed in a circular form is not restricted to this shape. Variations in the number of rows of grooves and teeth may be made. The mating surfaces need not be concentric with the case and cover member. Variations in shape of protrusions and grooves are permissible without departing from the teachings of this invention. Other forms of permanent connection other than bolts and bolt holes may be freely introduced without departing from the principles taught herein. If desired both case and cover apertures could be threaded and the bolt modified accordingly.

Obviously, many modifications and variations of the present invention are possible in the light of the above teachings. It is therefore to be understood that within the scope of the appended claims the invention may be practiced otherwise than as specifically described.

I claim:

1. A radio frequency attenuation seal comprising a member with at least one flat face having a series of immediately adjacent peripheral sawtooth protuberances defined entirely by oppositely sloped alternating angularly disposed intersecting surfaces on said face, a cooperating member having mating indentations on one face thereof, said indentations being of a depth relatively less than the height of said protuberances and of size and shape and spacing to receive said protuberances in substantially interfitting relationship, and attachment means for joining said members to form a radio frequency attenuation seal, thereby providing for continuous intimate contact with contiguous portions of said angularly disposed intersecting surfaces of said protuberances.

2. A casing member with at least one flat surface having a plurality of concentric continuous ring shaped grooves forming intermittent recesses therein, said grooves being substantially V-shaped in cross-sectional configuration, a cover member having a flat surface opposed to the grooved flat surface of said casing member, said cover member flat surface having integral concentric ring shaped serrations protruding therefrom, the serrations being substantially V-shaped in cross-sectional configuration for bearingly interfitted engagement with said grooves, said serrations having an altitude of greater magnitude than the depth of said grooves and aligned with and inserted in said grooves in mating relationship, peripheral securing means whereby a minimum of force need be exerted by said securing means to hold the cover to the case for effective radio frequency sealing, and a resilient gasket mounted circumferentially between the respective flat surfaces of the casing member and the cover member for effecting an air, water, and oil seal.

References Cited in the file of this patent

UNITED STATES PATENTS

| | | |
|---|---|---|
| 1,468,187 | Werbeck | Sept. 18, 1923 |
| 2,527,908 | Blitz | Oct. 31, 1950 |
| 2,604,507 | Tyson | July 22, 1952 |